Dec. 16, 1969  D. D. WRANOSKY  3,483,795
CLOSED LOOP FEEDBACK FOR MACHINING
Filed June 9, 1967  3 Sheets-Sheet 1

INVENTOR.
DONALD D. WRANOSKY
BY Richard D. Seibel
ATTORNEY

Dec. 16, 1969    D. D. WRANOSKY    3,483,795
CLOSED LOOP FEEDBACK FOR MACHINING
Filed June 9, 1967    3 Sheets-Sheet 2

INVENTOR.
DONALD D. WRANOSKY
BY Richard D. Seibel
ATTORNEY

INVENTOR.
DONALD D. WRANOSKY

BY

ATTORNEY

United States Patent Office 3,483,795
Patented Dec. 16, 1969

3,483,795
CLOSED LOOP FEEDBACK FOR MACHINING
Donald D. Wranosky, La Habra, Calif., assignor to North American Rockwell Corporation, a corporation of Delaware
Filed June 9, 1967, Ser. No. 644,964
Int. Cl. B23c *1/16, 1/18, 3/00*
U.S. Cl. 90—13.5        13 Claims

ABSTRACT OF THE DISCLOSURE

A precision machining technique is described wherein the actual thickness of the part being machined is continuously monitored during machining and compared with a desired thickness. Adjustments are then made by a closed loop feedback system to the cutter mechanism for adjusting the thickness of remaining material to the desired value. An ultrasonic transducer is employed in the center of a milling cutter for continuously measuring the distance between the two sides of the workpiece from the same side as the machining operation. Cutting fluid is forced around the transducer to the cutting surface thereby serving the dual purpose of transmitting ultrasonic pulses and providing a machining fluid.

BACKGROUND

The invention described herein was made in the performance of work under a NASA contract and is subject to the provisions of the National Aeronautics and Space Act of 1958, Public Law 85–568 (72 Stat. 426; 42 U.S.C. 2451) as amended.

In producing large, relatively thin, machined components it is often necessary to achieve close thickness tolerances. Thus, for example, close tolerance machining of thin areas of fin reinforced sections of large rocket boosters can result in substantial weight savings as compared with machining to broader tolerance. Conventional techniques for close tolerance machining have employed micrometer dial settings or table bed adjustments to establish the depth of cut. These adjustments are made manually or by automatically controlled machinery and the result is control of the depth of cut or of the cutter position relative to the bed, rather than the actual thickness of the part machined.

Conventional systems have no means for compensating for unintentional irregulatories in the opposite side of the workpiece or thermal or stress type distortions thereof, such as oil canning. Thus, for example, if the workpiece is raised off the machined bed, the cut is too deep. Likewise conventional systems do not compensate for cutting tool wear or machine backlash. Another basic problem which plagues the machinist is measuring the dimensions of a large work piece without removing the same from its jig or holding fixture. In present practice the operator must compensate for tool wear, workpiece deflection, and machine backlash by a trial and error technique based on his past experience and knowledge. Inspection of workpieces after machining requires a separate operation and extra handling thereof.

It is therefor desirable to employ a technique for continuously measuring and controlling thickness of a workpiece during machining.

BRIEF SUMMARY OF THE INVENTION

Thus, there is provided in the practice of this invention according to a preferred embodiment means for continuously measuring a dimension of a workpiece at the point of and time of changing dimension and feedback means for controlling the changing dimension to obtain a desired workpiece thickness. In a preferred embodiment an ultrasonic transducer is mounted in a milling cutter so as to be on the same side of the workpiece as the cutter, and cutting fluid is passed therearound, thereby providing both cutting lubrication and a transmission medium for ultrasonic pulses.

Objectives and many of the attendant advantages of this invention will be readily appreciated as the same becomes better understood by reference to the following detailed description when considered in connection with the accompanying drawings wherein.

Throughout the drawings like reference numerals refer to like parts.

An example of a machining problem encountered in practice involves milling of liquid hydrogen tank panels for a large rocket booster. These panels are fabricated from large aluminum plates approximately 8 feet by 30 feet by 2 inches thick. In order to minimize weight and still provide structural stiffening, pockets are milled out of the plates in a waffle pattern with close tolerance of the thickness of the sheet at the bottom of the pockets. The remaining fins stiffen the sheet. The skin panels are first milled smooth on one side to a thickness of about 1⅞" to leave a sheet with a total weight of about 6,100 pounds. The sheet or plate is then turned over on the milling machine and a rough cut made to remove about 4,900 pounds of metal. The rough cutter is then replaced with a fine cutter and the material is carefully vacuum chucked onto the bed of the milling machine before final machining. A numerically controlled milling machine is employed and a finished part is produced according to tape commands fed into the machine director.

Although vacuum chucks have been found to be the best method to hold a large piece of material such as the liquid hydrogen tank panel, problems still exist due to waviness of the material, internal stresses in the material, and due to the different stresses and tolerances which accumulate in the milling machine while in operation. It has, therefore, been the practice after the part is removed from the milling machine to make thickness measurements; and the liquid hydrogen panels were then hand finished or replaced in the milling machine an certain sections recut to meet the weight an thickness tolerances which were specified. It was often found that panels so produced were 15 to 20 pounds overweight and about 450 hours per panel were required for hand finishing to meet thickness and weight requirements. In addition because of the inherent tolerance of the prior machining techniques, the normal thickness of the panels may be about 0.004 inch greater than the minimum thickness which can be tolerated because of stress consideration.

With a continuous measurement of work piece thickness during milling and at the point of milling as provided in practice of this invention, the thickness tolerance is reduced to about 0.001 inch above the minimum allowed because of stress considerations. This closer tolerance machining reduces the allowable weight of each panel by about 100 pounds which accumulates to a weight saving for a typical vehicle of over one ton.

Figure 1:
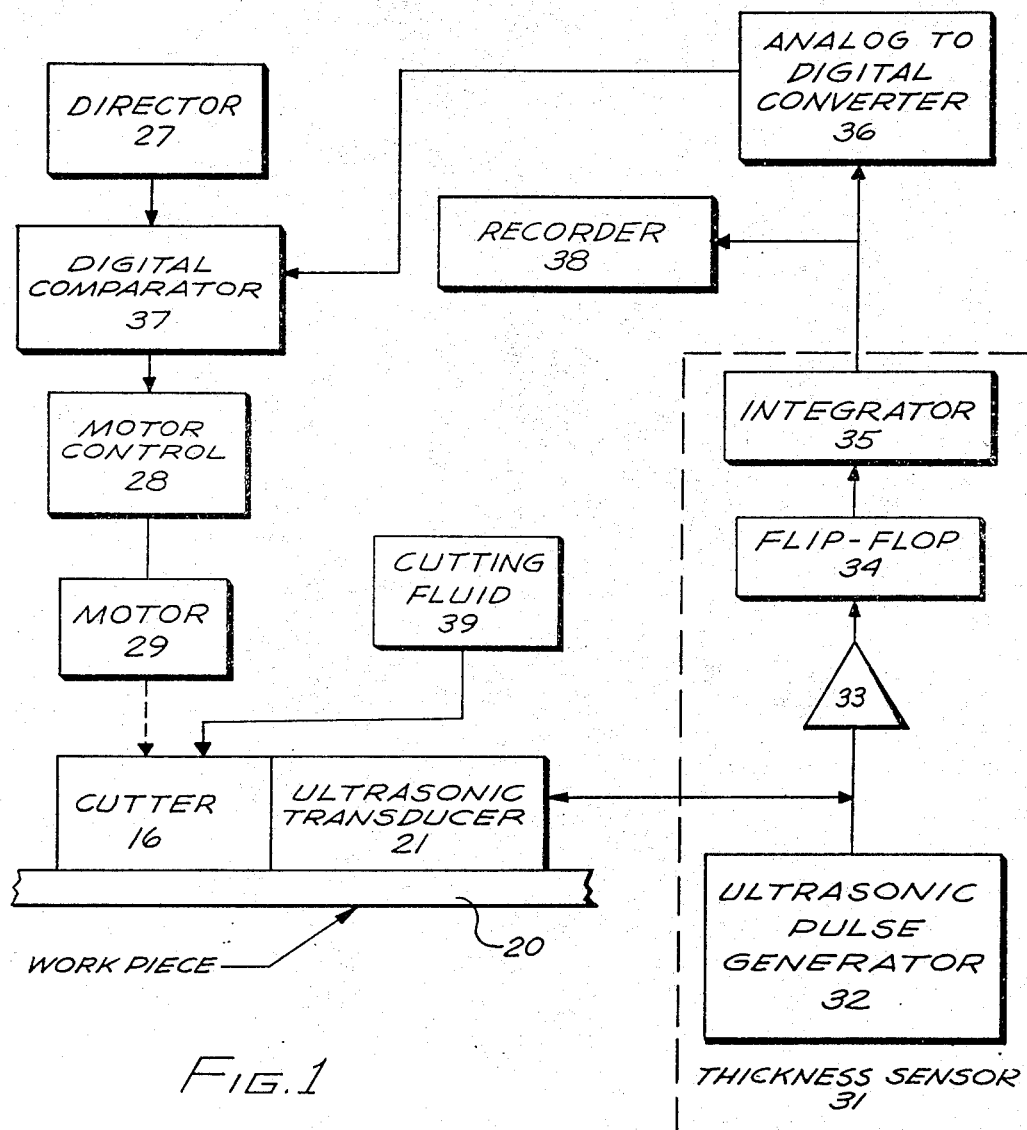
FIG. 1 illustrates in block diagram form a feedback control system for machining.

FIG. 1 illustrates a typical control arrangement for a milling machine in block diagram form. In conventional milling operations a numerically controlled milling machine has a tape director 27 or the like which commands a motor control 28 which in turn adjusts a motor 29 for controlling a cutter 16 in the z or vertical direction. The conventional machine may employ a position feedback loop (not shown) for comparing cutter position with the command position. Other tape control units may concurrently control the x and y travels of the cutter or the bed holding the workpiece beneath the cutter in response to commands on magnetic or punched tape. In conventional numerically controlled machines a preselected vertical position of the cutter relative to the machine bed is employed to control the depth of cut and hence, indirectly, workpiece thickness.

In the preferred embodiment as illustrated in FIG. 1 closed loop feedback control is provided for adjusting the motor control command signal from the tape director in response to actual thickness of a workpiece. This feedback loop may be provided in addition to or superimposed upon or in the place of the usual position control feedback loop of conventional machines. As illustrated in FIG. 1 an ultrasonic transducer 21 is arranged adjacent a workpiece 20 for measuring the thickness thereof. The transducer 21 is coupled to the cutter 16 for motion therewith as pointed out in more detail hereinafter. Ultrasonic thickness measurement is a conventional technique wherein a short duration compressional wave pulse is generated by an ultrasonic transducer and transmitted to a workpiece to be measured, and the echos from the workpiece are reconverted to electrical signals by the ultrasonic transducer. The thickness measurement is made by noting the time for the pulse to travel through the workpiece and from front to back and, upon reflection from the back side thereof, from back to front, this time being a function only of the thickness of the workpiece and the velocity of sound therein.

Thus, a conventional thickness sensor 31 may be employed with the ultrasonic transducer 21. A typical thickness sensor comprises a Type UM721 reflectoscope. A 10 megacycle Type UM pulser/receiver and a Type TR thickness readout are employed for generating and measuring ultrasonic pulses in such a unit, all available as off the shelf items from Sperry Products Company. Thus, a typical thickness sensor 31 may comprise an ultrasonic pulse generator 32 which generates very short duration electric pulses. These short pulses are applied to the ultrasonic transducer 21 which converts the electrical pulses to longitudinal ultrasonic pulses. The ultrasonic pulses are transmitted from the ultrasonic transducer through cutting fluid between the transducer and workpiece and produce reflections or echos at the front and back surfaces, respectively of the workpiece. These echos are reconverted to electrical signals by the ultrasonic transducer 21. The electrical echo signals are amplified by an amplifier 33 and applied to a bi-stable device such as flip-flop 34. The flip-flop changes state for each of the two echo signals and thus provide an essentially square wave signal having a time interval corresponding to the time between the two echos, that is the round-trip time for a pulse through the workpiece 20 The thickness sensor includes means, not shown, to prevent transmitted pulses from generator 32 from operating the flip-flop.

The square pulse from the flip-flop 34 is applied to an integrator 35 which provides a voltage that linearly increases with time thereby providing a voltage signal representative of the thickness of the workpiece 20 as measured by the ultrasonic transducer 21. In a preferred embodiment the voltage signal is applied to an analog to digital converter 36 for use with the digital numerically controlled milling machines commonly employed in industry. The digital signal from the analog to digital converter 36 corresponding to measured workpiece thickness, is applied to a digital comparator 37 where it is compared with the command signal from the director 27 which specifies the desired thickness (z dimension) of the workpiece at this (x, y) location. The error signal from the digital comparator is applied to the motor control 28 for adjusting the vertical or z position of a milling cutter 16. The comparator 37 comprises a conventional correction combining circuit wherein the command signal is modified in response to a measured signal.

In the illustrated arrangement director 27 provides a digital signal representing the commanded position of the cutter relative to the lower surface of the workpiece (nominally the bed upon which the workpiece rests). This is the specified workpiece thickness. Because the workpiece at some points may not be directly in contact with the bed due to oil canning or other factors, the actual thickness of the workiece could differ from the specified thickness. The comparator 37 compares measured and commanded thickness and provides an error signal to motor control 28 to cause correction of cutter position.

In the alternative, as will be apparent to one skilled in the art, the analog signal from the integrator 35 can be compared with an analog director signal by means of an analog comparator. Likewise closed loop feedback control of the milling machine can be accomplished by applying the measured thickness signal for modifying the commanded cutter position as provided in U.S. Patent 2,988,-681. The measured thickness may be compared with a nominal thickness in such arrangement to provide a measured thickness error signal or correction signal that is combined with the conventional feedback position signal prior to comparison of the latter with the commanded position from the director.

It will also be apparent that noise filters and other refinements can be employed with such a system as are conventional in the servomechanism art. Thus, continuous measurement of the actual thickness of the workpiece at the point and time of machining is made so that continuous feedback adjustment of the actual thickness of the workpiece can be made, rather than merely adjustment of the cutter relative to the machine bed or other arbitrary reference as has been the practice.

Measurement of the thickness of the workpiece from the opposite side from the cutting operation on large workpiece is usually impractical because of the problem of interference between the transducer mounting and the jigs and fixtures required to hold large workpieces. It is therefore desirable to mount the measuring transducer on the same side of the workpiece as the cutter and as illustrated in FIG. 1, the transducer and cutter are interconnected or coupled so as to traverse the workpiece in synchronism.

If, however, the transducer is displaced any appreciable distance from the cutter for measuring thickness after the cutter has passed, there is a delay between the cutting and measuring operations and difficult feedlback problems are encountered wherein oscillatory corrections occur or delay or anticipation means must be incorporated. Also, in cutting operations wherein the cutter may move in any direction, there is no suitable location for a sensor adjacent a cutter. In an arrangement provided in the practice of this invention according to a preferred embodiment, the measurement is made substantially at the location of the cutting operation and continuously therewith. This minimizes the time and distance delays and the problems associated therewith and permits highly accurate closed loop feedback control of actual workpiece thickness.

Figure 2:
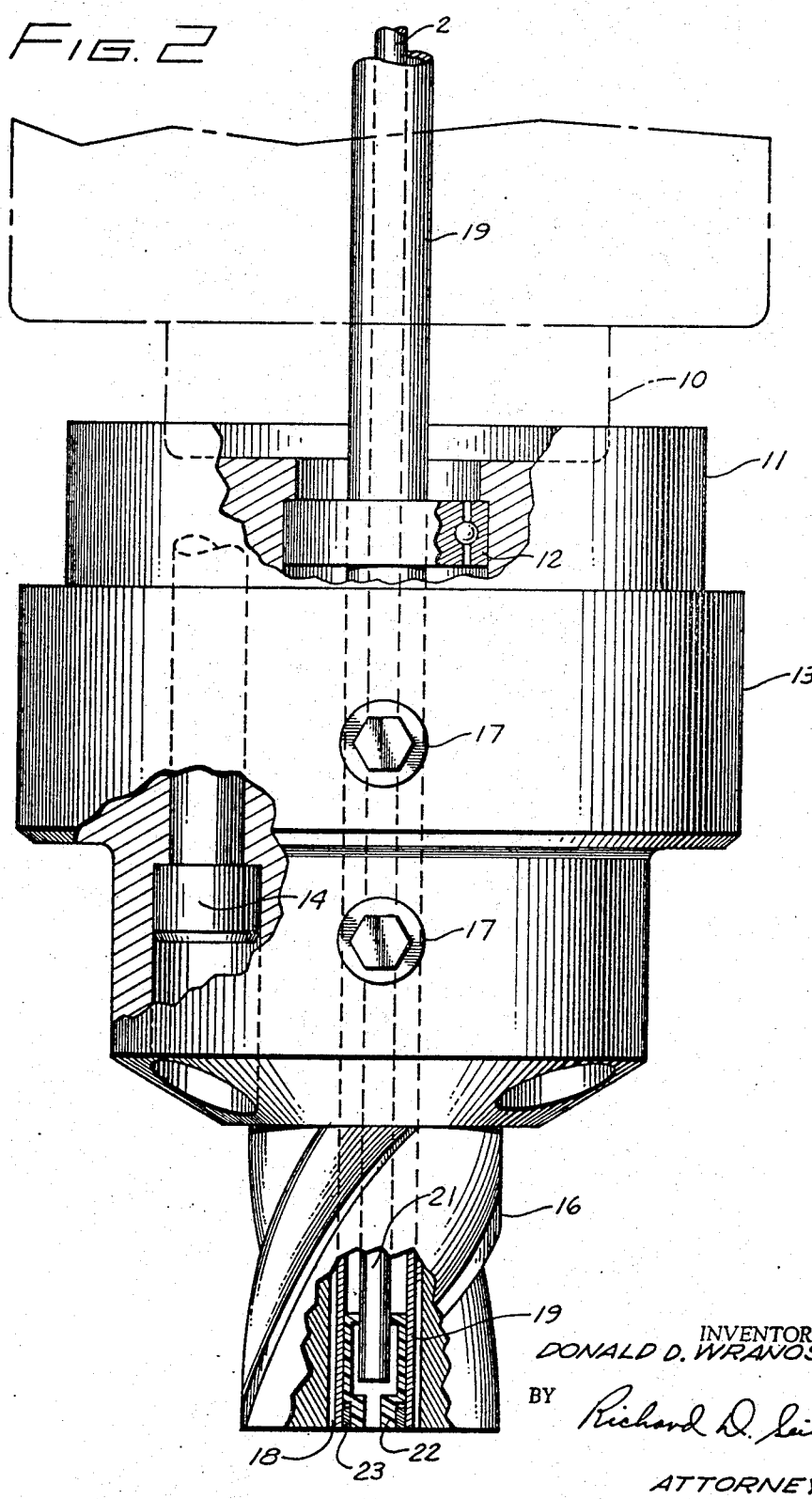
FIG. 2 illustrates in partial cutaway a milling machine attachment constructed according to the principles of this invention.

FIG. 2 illustrates a typical milling cutter incorporating principles of this invention. As illustrated in this figure there is provided a conventional vertical milling machine, the spindle 10 of which is illustrated in phantom in FIG. 2. An adapter 11 is connected to the spindle 10 and contains a conventional ball bearing 12. A conventional cutter head 13 is secured to the adapter 11 by socket head cap screws 14 and an end mill 16 is secured to the cutter head 13 by cap screws 17. In a typical embodiment the cutter 16 comprises a two inch end mill with a three quarter inch bore 18 axially located therein for accommodating a transducer. During operation of such a piece of apparatus the spindle 10, adapter 11, cutter head 13, and end mill 16 rotate together and traverse the workpiece for machining thereof.

Axially mounted in the assembly and extending through the head of the milling machine (not shown) is a steel tube 19. The tube 19 is mounted on the head of the milling machine so as to move vertically therewith and is mounted in bearings such as the ball bearing 12 so as to remain stationary during rotation of the milling machine spindle 10. A conventional cutting fluid for cooling and cutting lubrication is supplied from a source 39 (FIG. 1, not shown in FIG. 2) such as a pump or reservoir and passed into the tube 19 from the top thereof. The fluid exists at the bottom of the tube 19 at the face of the milling cutter 16 and provides the dual function of a conventional cutting fluid and transmission of ultrasonic pulses between the transducer and the workpiece.

Axially mounted in the tube 19 is a conventional ultrasonic transducer 21. A typical transducer assembly is one quarter inch outside diameter by 39 inches long which is sufficiently long to extend through the head of the milling machine (not shown) so as to avoid the necessity of making electrical connections thereto by means of slip rings. A transducer of these dimensions is available from Sperry Products Company. Such a transducer comprises a conventional piezoelectric material, such as quartz or barium titanate, for converting electrical pulses to mechanical deformations in the form of longitudinal ultrasonic compressional waves, or vice versa. The ultrasonic pulses are transmitted axially from the lower end of the ultrasonic transducer 21, through the cutting fluid and after reflection from both of the workpiece surfaces, are received by the transducer for reconverison to electrical pulses representative of the two echos.

Figure 3:
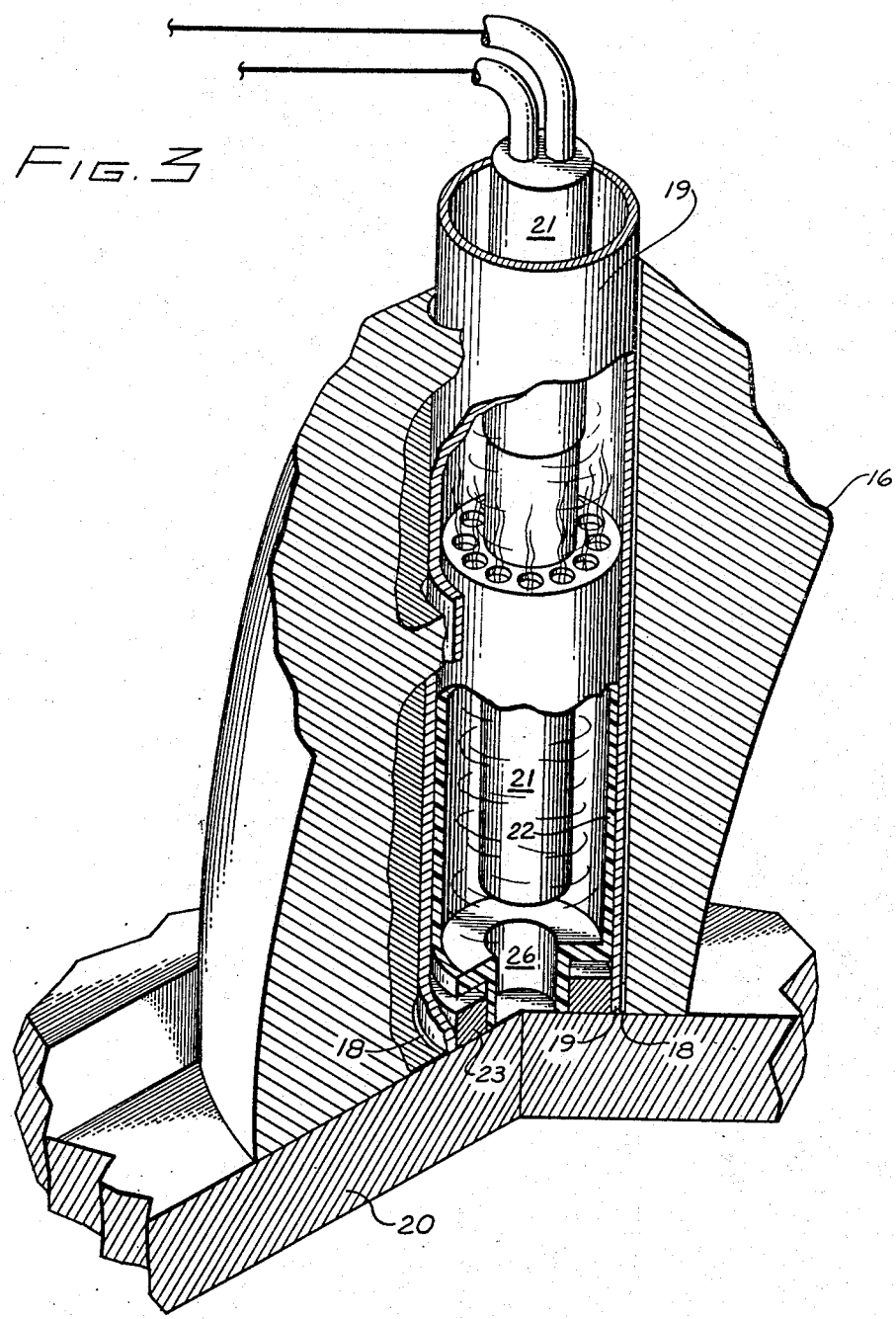
FIG. 3 illustrates in greater detail in perspective cutaway an ultrasonic transducer in the milling cutter of FIG. 2.

FIG. 3 illustrates in greater detail a cutter 16, and an ultrasoninc transducer 21 arranged with the cutter adjacent a workpiece 20 for milling along a surface thereof. The transducer 21 is centered in the tube 19 by a plastic insert 22 such as Teflon or the like. The plastic insert 22 is held in place in the tube by a snap ring 23. The plastic insert 22 includes a plurality of small holes 24 at the top thereof for transmitting cutting fluid. An axial hole 26 at the bottom end of the insert 22 is arranged opposite the end of the ultrasonic transducer 21, thereby providing communication for conventional cutting fluid from the interior of the tube 19 to the face of the cutter 16 adjacent the workpiece 20. Likewise, the hole 26 provides communication for ultrasonic pulses between the transducer 21 and the workpiece 20, transmitted by the cutting fluid.

As illustrated in the preferred empodiment an ultrasonic transducer is mounted axially in the cutter. It will be apparent that other means for measuring actual workpiece thickness can be employed and non-axial mounting of a sensor can be employed on the same side as the cutting operation. Nonaxial positioning of the transducer within the cutter permits vertical or end cuts to be made. It is recognized that axial positioning of the transducer in the cutter involves a very slight delay between cutting and measuring corresponding to less than the radius of the cutter since the cutting action is at the periphery of the cutter. This can be minimized by nonaxial positioning of the cutter. Nonaxial positioning may necessitate a filter for signal processing when tapers are being cut to assure measurement of the desired thickness as will be apparent to one skilled in the art. Signal from the detector located nonaxially may be picked off the rotating cutter head with slip rings or brushes. Other sensors than ultrasonic, such as electromagnetic energy wave measurement of non-metallic materials may also be used.

It will also be apparent that other means for changing workpiece dimensions can be involved such as drilling, planing, flame spraying, and the like. It will also be appreciated that whereas the described embodiment employs a cutter with vertical axis, that other directions can be employed. A significant aspect is that measuring of actual workpiece thickness is made continuously at the time and place of machining and it will be apparent that an automatic closed loop feedback adjustment may not be needed in utilization of this aspect o fthe invention since thickness measurements are valuable in and of themselves without simultaneous control of machine operation.

In addition to measuring workpiece thickness, the ultrasonic technique detects voids, cracks, delaminations, or inclusions in material remaining after machining. Thus, any minor undetected flaws in the remaining material which were not detected in the initial testing of the raw material are detected and remedial action can be taken, if necessary. The defects are noted as anomalous echos appearing at a substantially different time interval than the anticipated signals. If desired a recorder 38 (FIG. 1) can be employed for providing a continuous record of the time interval signals from the integrator 35 and anomalous values are readily observed for later re-checking and for providing a permanent record of possible defects. Thus in addition to measuring thickness and controlling cutting, practice of this invention provides an inspection record and minimizes inspection required after machining.

Obviously many modifications and variations of the present invention are possible in light of the above teachings. It is therefore to be understood that within the scope of the appended claims the invention may be practiced otherwise than as specifically described.

What is claimed is:
1. Machining apparatus comprising:
   tool means for machining a workpiece to change a dimension thereof;
   means on the same side of said workpiece as said tool means for monitoring said dimension as the tool traverses the workpiece, said monitoring means being connected to said tool means for traversing the workpiece therewith, and said monitoring means including means for transmitting energy waves toward said workpiece and means for receiving reflected energy waves therefrom; and
   feedback means responsive to the monitoring means for controlling the tool means to effect a desired value of said dimension.

2. An apparatus as defined in claim 1 wherein said means for transmitting energy waves comprises an ultrasonic transducer mounted in said tool means.

3. An apparatus comprising means for changing thickness of a workpiece;
   means on the same side of the workpiece as the means for changing thickness for continuously measuring the actual thickness of the workpiece substantially at the point of change during the changing thereof; and
   feedback means for continuously adjusting the means for changing in response to the measured thickness;

4. An apparatus as defined in claim 3 including means for causing said thickness changing and measuring means to traverse the workpiece in synchronism.

5. An apparatus as defined in claim 3 wherein the means for changing thickness comprises a cutting tool for cutting material from the workpiece.

6. An apparatus as defined in claim 5 wherein the cutting tool comprises an end mill.

7. An apparatus as defined in claim 3 wherein said means for measuring is mounted in said means for changing.

8. An apparatus comprising:
   means for changing dimensions of a workpiece;
   an ultrasonic thickness sensor on the same side of the workpiece as the means for changing dimension for continuously measuring the thickness of the workpiece substantially at the point of change during the changing thereof; and
   feedback means for continuously adjusting the means for changing in response to the measured dimension.

9. An apparatus as defined in claim 8 wherein said means for changing dimensions comprises a cutting tool and wherein said ultrasonic transducer is mounted within said cutting tool.

10. A method of machining a plate like workpiece comprising:
progressively moving a cutter from point to point along a surface of a workpiece;
continuously measuring actual thickness of the workpiece at the point and time of cutting; and
continuously adjusting the cutter for providing a predetermined thickness of workpiece.

11. An apparatus comprising:
means for forming a workpiece; and
means for continuously measuring the actual thickness of the workpiece at the time and place of forming, said means for measuring being on the same side of the workpiece as the means for forming.

12. An apparatus as defined in claim 11 wherein the means for measuring comprises an ultrasonic transducer mounted in said means for forming.

13. An apparatus as defined in claim 12 wherein said means for forming comprises a cutter; and further comprising:
means for supplying a cutting fluid to said cutter for aiding cutting and also for transmitting ultrasonic pulses.

References Cited

UNITED STATES PATENTS

| | | | |
|---|---|---|---|
| 1,872,667 | 8/1932 | Bryant | 82—34 |
| 2,372,427 | 3/1945 | Johnson | 82—14 |
| 2,485,355 | 10/1949 | Brennan | 82—34 |
| 2,681,595 | 6/1954 | Le Compte | 82—14 |
| 2,831,387 | 4/1958 | Ovshinsky | 82—34 |
| 2,927,258 | 3/1960 | Lippel | 90—13.99 |
| 3,269,233 | 8/1966 | Lothmann | 90—13.99 |

GERALD A. DOST, Primary Examiner

U.S. Cl. X.R.

33—172; 90—11